United States Patent [19]
Lund et al.

[11] Patent Number: 4,900,365
[45] Date of Patent: Feb. 13, 1990

[54] AZEOTROPE-LIKE COMPOSITIONS OF TRICHLOROFLUOROMETHANE, DICHLOROTRIFLUOROETHANE AND ISOPENTANE

[75] Inventors: Earl E. A. Lund, West Seneca; Robert G. Richard, Cheektowaga; Ian R. Shankland, Williamsville, all of N.Y.

[73] Assignee: Allied-Signal Inc., Morris Township, Morris County, N.J.

[21] Appl. No.: 240,655

[22] Filed: Sep. 6, 1988

[51] Int. Cl.[4] ............................ C08G 18/14; C08J 9/14
[52] U.S. Cl. ........................................ 134/12; 134/38; 134/39; 134/40; 252/67; 252/126; 252/162; 252/172; 252/364; 252/DIG. 9; 521/131
[58] Field of Search ................. 252/67, 126, 162, 364, 252/DIG. 9, 172; 521/131; 134/12, 38, 39, 40

[56] References Cited

U.S. PATENT DOCUMENTS

| | | | |
|---|---|---|---|
| 3,249,546 | 5/1966 | Eiseman | 252/67 |
| 3,332,881 | 7/1967 | Burt et al. | 252/162 |
| 3,940,342 | 2/1976 | Hutchinson | 252/171 |
| 4,002,573 | 1/1977 | Hutchinson | 252/171 |
| 4,055,521 | 10/1977 | Taub et al. | 521/131 |
| 4,531,950 | 7/1985 | Burt | 55/23 |
| 4,531,951 | 7/1985 | Burt et al. | 55/23 |
| 4,624,970 | 11/1986 | Dwyer et al. | 521/131 |
| 4,771,080 | 9/1988 | Ikuki et al. | 521/56 |

FOREIGN PATENT DOCUMENTS

| | | | |
|---|---|---|---|
| 6412607 | 5/1965 | Netherlands | 252/67 |
| 539935 | 1/1977 | U.S.S.R. | |

OTHER PUBLICATIONS

CRC Handbook of Chemistry & Physics, Weast, 62nd Ed., 1981, pp. D1–D9.

*Primary Examiner*—Maurice J. Welsh
*Assistant Examiner*—L. Henderson
*Attorney, Agent, or Firm*—Jay P. Friedenson

[57] ABSTRACT

Azeotrope-like compositions comprising trichlorofluoromethane, a dichlorotrifluoroethane selected from the group consisting of 1,1-dichloro-2,2,2-trifluoroethane and 1,2-dichloro-1,1,2-trifluoroethane and isopentane are novel compositions particularly useful as blowing agents in the preparation of polyurethane and polyisocyanurate foams.

13 Claims, No Drawings

AZEOTROPE-LIKE COMPOSITIONS OF TRICHLOROFLUOROMETHANE, DICHLOROTRIFLUOROETHANE AND ISOPENTANE

DESCRIPTION

FIELD OF THE INVENTION

This invention relates to azeotrope-like mixtures of trichlorofluoromethane, dichlorotrifluoroethane and isopentane. These mixtures are useful as blowing agents in the manufacture of rigid and flexible polyurethane foams and polyisocyanurate foams.

BACKGROUND OF THE INVENTION

Polyurethane and polyisocyanurate foams are manufactured by reacting and foaming a mixture of ingredients comprising in general an organic isocyanate, such as pure or crude toluene diisocyanate or a polymeric diisocyanate, with an appropriate amount of polyol or mixture of polyols, in the presence of a volatile liquid blowing agent, which vaporizes during the reaction, causing the polymerizing mixture of foam. The reactivity of these ingredients is enhanced through the use of various additives such as amine and/or tin catalysts and surfactant materials which serve to control and adjust cell size as well as to stabilize the foam structure during its formation.

Flexible polyurethane foams are generally manufactured using an excess of diisocyanate which reacts with the water also included as a raw material, producing gaseous carbon dioxide, causing foam expansion. Flexible foams are widely used as cushioning materials in items such as furniture, bedding and automobiles. Auxiliary physical blowing agents such as methylene chloride and/or CFC-11 are required in addition to the water/diisocyanate blowing mechanism in order to produce low density, soft grades of flexible polyurethane foam.

Rigid polyurethane and polyisocyanurate foams are almost exclusively expanded using CFC-11 as the blowing agent. Some rigid foam formulations do incorporate small amounts of water in addition to the CFC-11, but the CFC-11 is the major blowing agent component. Other formulations sometimes use small amounts of the more volatile dichlorodifluoromethane (CFC-12) in addition to CFC-11 for producing so-called froth-type foams. Rigid foams are closed-cell foams in which the CFC-11 vapor is trapped in the matrix of cells. These foams offer excellent thermal insulation characteristics, due in part to the low vapor thermal conductivity of CFC-11, and are used widely in thermal insulation applications such as roofing systems, building panels, refrigerators and freezers and the like.

The fully halogenated chlorofluorocarbons such as CFC-11 are suspected of causing environmental problems in connection with the earth's protective ozone layer. Concern over the potential environmental impact of CFC emissions has prompted a phased reduction in fully halogenated CFC production and consumption. The azeotrope-like blowing agent blends described in this invention offer the potential of a 34 percent reduction in CFC-11 use. The other components of the blends, namely dichlorotrifluoroethane and isopentane, have very low ozone depletion potentials in comparison to CFC-11.

Although methylene chloride is used as an auxiliary blowing agent in flexible polyurethane foam manufacture, it has found very little application as a blowing agent in the rigid urethane-type foams. Methylene chloride tends to remain dissolved in the polymeric back bone of the foam due to its greater solvency characteristics. The residual methylene chloride softens and plasticizes the polymer leading to foam collapse or excessive shrinkage as well as a reduction in the strength properties of the rigid foam. Some rigid foam formulations can tolerate small amounts of methylene chloride as a component of the blowing agent, for example, Taub and Ostrozynski in U.S. Pat. No. 4,055,521 demonstrate that a blend consisting of 83 parts CFC-11, 12 parts isopentane and 5 parts methylene chloride can be used to expand a rigid polyurethane foam with good properties. However, use of even these small amounts of methylene chloride in closed-cell foams may be objectionable due to the adverse toxicological properties of methylene chloride.

Other volatile liquids such as hydrocarbons have not found acceptance as blowing agents for polyurethane-type foams due to their extreme flammability and poor thermal conductivity properties. These aspects outweigh the economic advantages that hydrocarbons have over fluorocarbons. Although the blends described in this invention do contain a hydrocarbon, it is present as a minor component and overall the blends are nonflammable as evidenced by flash point tests. Furthermore, as the present blends are azeotrope-like in nature, their vapor and liquid compositions are identical and the flammable hydrocarbon component will not fractionate or segregate from the mixture during boiling or evaporation.

U.S. Pat. Nos. 3,940,342 and 4,002,573 discloses binary constant boiling compositions of 1,2-dichloro-1,1,2-trifluoroethane with trichlorofluoromethane, with diethyl ether and with dichloromethane and also ternary constant boiling compositions comprising 1,2-dichloro-1,1,2-trichloroethane, diethyl ether and 1,2-dibromo-1,1,2,2-tetrafluoroethane.

U.S. Pat. No. 4,624,970 discloses the use of mixtures of CFC-11 and HCFC-123 or HCFC-123a to blow urethane type foams. Such blowing agent mixtures were found to permit greater amounts of low cost aromatic polyester polyols to be used in rigid foam formulations without serious degredation in foam properties.

It is accordingly an object of this invention to provide novel azeotrope-like compositions based on a fluorocarbon which is not fully halogenated, which can be used as blowing agents to produce rigid and flexible polyurethane foams and polyisocyanurate foams with good properties.

Other objects and advantages of the invention will become apparent from the following description of the invention.

In accordance with the invention, novel azeotrope-like compositions are provided comprising trichlorofluoromethane, a dichlorotrifluoroethane selected from the group consisting of 2,2-dichloro-1,1,1-trifluoroethane ethane (HCFC-123) and 1,2-dichloro-1,1,2-trifluoroethane (HCFC-123a) and isopentane which are useful as blowing agents in the manufacture of rigid and flexible polyurethane foams as well as polyisocyanurate foams. Such azeotropic compositions are formed when either of the above recited isomers of dichlorotrifluoroethane is employed in about the same proportions.

In a preferred embodiment of the invention, azeotrope-like compositions comprise from about 66 to about 80 weight percent trichlorofluoromethane (CFC-11), from about 17 to 15 weight percent of the recited dichlorotrifluoroethane isomers and from about 17 to 5 weight percent isopentane. The dichlorotrifluoroethane isomers, not being perhalogenated, are considered to be stratospherically safe. Both of the recited isomers form azeotrope-like compositions with trichlorofluoromethane and isopentane. Our best estimate of the minimum boiling azeotropic composition is about 79 weight percent CFC-11, about 15 weight percent of the recited dichlorofluoroethane isomers and about 6 weight percent isopentane. These mixtures are nonflammable liquids, do not fractionate upon evaporation or boiling and provide about 20 to 34 percent reduction in the amount of fully halogenated CFC-11 required to expand the foam. Their expansion efficiency (gas volume generated per unit weight) is better than CFC-11 alone and they also produce foams with similar thermal insulation characteristics to foams expanded with CFC-11.

DESCRIPTION OF THE INVENTION

The novel azeotrope-like compositions of the invention comprise CFC-11, dichlorotrifluoroethane (HCFC-123 or HCFC-123a) and isopentane.

For ease of reference the HCFC-123 or HCFC-123a isomers will sometimes be referred to collectively as "dichlorotrifluoroethane".

In a preferred embodiment of the invention, the azeotrope-like compositions comprise from about 66 to about 80 weight percent CFC-11, from about 17 to about 15 weight percent dichlorotrifluoroethane and from about 17 to about 5 weight percent isopentane.

Our best estimate of the true azeotrope containing HCFC-123 is about 79 weight percent CFC-11, about 15 weight percent HCFC-123 and about 6 weight percent isopentane. The azeotropic composition of the isomeric system is very similar, about 78 weight percent CFC-11, about 15 weight percent HCFC-123a and about 7 weight percent isopentane.

The precise or true azeotrope compositions have not been determined but have been ascertained to be within the indicated ranges. Regardless of where the true azeotrope lies, all compositions within the indicated ranges, as well as certain compositions outside the indicated ranges, are azeotrope-like, as defined more particularly below.

The compositions of the invention are capable of expanding polyurethane-type foams possessing very good characteristics in comparison to foams expanded with CFC-11 alone. An advantage of using the compositions of the invention to blow urethane-type foams is that foams produced with such compositions consume less CFC-11 and will therefore emit less CFC-11. The expansion efficiency of the blends, that is gas volume generated per unit weight of blowing agent, is greater than that of CFC-11.

Compositions within the azeotrope-like region do not exhibit flash points and are classified as nonflammable liquids. At the low isopentane composition the vapor phase does not possess flame limits while at the high isopentane composition it does exhibit very narrow flame limits in air. This narrow range of vapor flammability will not inhibit the use of these blends as urethane foam blowing agents.

From fundamental principles, the thermodynamic state of a fluid is defined by four variables: pressure, temperature, liquid composition and vapor composition, or P-T-X-Y, respectively. An azeotrope is a unique characteristic of a system of two or more components where X and Y are equal at the stated P and T. In practice, this means that the components of a mixture cannot be separated during evaporation or boiling and hence simultaneous vaporization in a constant proportion of all the components of the azeotrope-like mixture will occur during the foam forming process. An additional consequence of the azeotrope-like behavior is that it is not possible to separate the flammable isopentane component from the blend by evaporation, which could happen if the blend were not azeotrope-like leading to a potentially hazardous situation.

For the purpose of this discussion, by azeotrope-like composition is intended to mean that the composition behaves like a true azeotrope in terms of its constant boiling characteristics or tendency not to fractionate upon boiling or evaporation. Such composition may or may not be a true azeotrope. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

Thus, one way to determine whether a candidate mixture is "azeotrope-like" within the meaning of this invention, is to distill a sample thereof under conditions (i.e. resolution-number of plates) which would be expected to separate the mixture into its separate components. If the mixture is non-azeotropic or non-azeotrope-like, the mixture will fractionate, i.e. separate into its various components with the lowest boiling component distilling off first, and so on. If the mixture is azeotrope-like, some finite amount of a first distillation cut will be obtained which contains all of the mixture components and which is constant boiling or behaves as a single substance. This phenomenon cannot occur if the mixture is not azeotrope-like i.e., it is not part of an azeotropic system. If the degree of fractionation of the candidate mixture is unduly great, then a composition closer to the true azeotrope must be selected to minimize fractionation.

It follows from the above that another characteristic of azeotropic-like compositions is that there is a range of compositions containing the same components in varying proportions which are azeotrope-like. All such compositions are intended to be covered by the term azeotrope-like as used herein. As an example, it is well known that at differing pressures, the composition of a given azeotrope will vary at least slightly as does the boiling point of the composition. Thus, an azeotrope of A and B represents a unique type of relationship but with a variable composition depending on temperature and/or pressure.

In the process embodiment of the invention, the azeotrope-like compositions of the invention may be used as blowing agents for the preparation of flexible and rigid polyurethane foams as well as rigid polyisocyanurate foams by reacting and foaming a mixture of ingredients which will form the polymeric foam in the presence of said blowing agent compositions.

EXAMPLE 1

This example confirms the existence of an azeotrope between CFC-11, HCFC-123 and isopentane as well as confirming the existence of an azeotrope between CFC-11, HCFC-123a and isopentane. The method of distillation is employed in this example.

A 15-plate Oldershaw distillation column with a cold water cooled automated liquid dividing head was used for this example. The distillation column was first charged with approximately 580 grams of 79.5 weight percent CFC-11, 14.5 weight percent HCFC-123 and 6.0 weight percent isopentane. The mixture was heated under total reflux for a period of about one and half hours to ensure equilibration. A 10:1 reflux ratio was used in this distillation. About 60 percent of the original charge was collected in 7 overhead fractions. The composition of these fractions as well as the composition of the residue in the distillation column were determined by gas chromatography. Table I shows that the compositions of the starting material, the compositions of the 7 distillate fractions, and the composition of the column residue are identical within the uncertainty associated with the analytical technique. The equivalent liquid and vapor compositions indicate that the mixture is an azeotrope. The composition of the azeotrope is in the region of about 79 weight percent CFC-11, about 15 weight percent HCFC-123 and about 6 weight percent isopentane.

TABLE I

CFC-11, HCFC-123 & Isopentane Distillation Data

| Mixture | Vapor Temperature (°C.) | Mixture Composition (parts by weight) | | |
|---|---|---|---|---|
| | | HCFC-123 | CFC-11 | Isopentane |
| Original Charge | | 14.4 | 79.8 | 5.8 |
| Distillate Fraction #1 | 23.3 | 14.9 | 79.0 | 6.1 |
| Distillate Fraction #2 | 23.3 | 14.6 | 79.5 | 5.9 |
| Distillate Fraction #3 | 23.3 | 15.0 | 79.0 | 6.0 |
| Distillate Fraction #4 | 23.6 | 15.0 | 79.0 | 6.0 |
| Distillate Fraction #5 | 23.7 | 14.6 | 79.6 | 5.8 |
| Distillate Fraction #6 | 23.6 | 14.5 | 79.8 | 5.7 |
| Distillate Fraction #7 | 23.6 | 14.4 | 79.8 | 5.8 |
| Liquid Residue | | 14.2 | 80.2 | 5.6 |

Barometric pressure = 754.6 mm Hg

A similar distillation, this time starting with a mixture in which the isomer HCFC-123a is used in place of HCFC-123 also provides evidence of an azeotrope. These distillation results are summarized in Table II. The azeotropic composition for this mixture is about 78 weight percent CFC-11, about 15 weight percent HCFC-123a and about 7 weight percent isopentane.

TABLE II

CFC-11, HCFC-123a & Isopentane Distillation Data

| Mixture | Vapor Temperature (°C.) | Mixture Composition (parts by weight) | | |
|---|---|---|---|---|
| | | HCFC-123a | CFC-11 | Isopentane |
| Original Charge | | 16.3 | 76.7 | 7.0 |
| Distillate Fraction #1 | 22.9 | 14.6 | 78.2 | 7.2 |
| Distillate Fraction #2 | 22.9 | 14.7 | 78.1 | 7.2 |
| Distillate Fraction #3 | 22.9 | 14.9 | 77.9 | 7.2 |
| Distillate Fraction #4 | 22.9* | 14.8 | 78.1 | 7.1 |
| Distillate Fraction #5 | 22.9 | 15.3 | 77.5 | 7.2 |
| Liquid Residue | | 17.5 | 75.6 | 6.9 |

Barometric pressure = 735.5 mm Hg

Although in the present case the two isomers, HCFC-123 and HCFC-123a, behave very similarly with respect to azeotrope formation with CFC-11 and isopentane, this, as is well known, is not always the case with isomers. For example, when the distillation of Table I is repeated using n-pentane in place of the isopentane, the mixture is observed to fractionate, indicating that the CFC-11/HCFC-123/n-pentane system is not an azeotrope or azeotrope-like.

EXAMPLE 2

This example describes additional distillations of CFC-11/HCFC-123/isopentane mixtures which are used to determine the constant boiling or azeotrope-like composition range.

The distillations were performed using a 5-plate Oldershaw distillation column at a 3:1 reflux ratio. The mixtures were heated at total reflux for about an hour and a half to ensure equilibration before collecting 50 percent of the original charge in 4 distillate fractions.

The vapor and liquid compositions were analyzed using gas chromatography.

CFC-11/HCFC-123/isopentane blends with compositions (by weight) of 64.6/15.3/20.1 and 69.7/15.4/14.9 were distilled in order to map the azeotrope-like region. The distillation date are shown in Table III.

TABLE III

Constant Boiling Characteristics

| Mixture | Vapor Temperature (°C.) | Mixture Composition (parts by weight) | | |
|---|---|---|---|---|
| | | HCFC-123 | CFC-11 | Isopentane |
| Original Charge | | 15.3 | 64.6 | 20.1 |
| Distillate Fraction #1 | 23.0 | 17.4 | 65.6 | 17.0 |
| Distillate Fraction #2 | 23.0 | 17.2 | 65.2 | 17.6 |
| Distillate Fraction #3 | 24.0 | 17.1 | 64.8 | 18.1 |
| Distillate Fraction #4 | 24.0 | 15.8 | 65.9 | 18.3 |
| Liquid Residue | | 12.8 | 63.4 | 23.9 |

Barometric pressure = 744.6 mm Hg

| Original Charge | | 15.4 | 69.7 | 14.9 |
|---|---|---|---|---|
| Distillate Fraction #1 | 22.9 | 16.9 | 70.0 | 13.1 |
| Distillate Fraction #2 | 22.9 | 17.2 | 69.2 | 13.6 |
| Distillate Fraction #3 | 23.0 | 16.4 | 70.1 | 13.5 |
| Distillate Fraction #4 | 23.1 | 16.1 | 70.0 | 13.9 |

TABLE III-continued

| | Constant Boiling Characteristics | | |
|---|---|---|---|
| | Vapor Temperature | Mixture Composition (parts by weight) | |
| Mixture | (°C.) | HCFC-123 | CFC-11 | Isopentane |
| Fraction #4 Liquid Residue | | 14.3 | 68.7 | 17.0 |
| Barometric pressure = 744.6 mm Hg | | | | |

These data, along with the data shown in Table I show that the region where vapor and liquid compositions are essentially identical, that is, the region where the mixture is azeotrope-like, includes the region of about 66 to 80 weight percent CFC-11, about 17 to 15 weight percent HCFC-123 and about 17 to 5 weight percent isopentane.

EXAMPLE 3

Flammability characteristics of various CFC-11/HCFC-123/isopentane blends are assessed in this example. The flammability of the liquids was determined using both Tag open cup (ASTM D 1310-86) and Tag closed cup (ASTM D 56-82) methods. Vapor flammability was measured using a eudiometer apparatus similar to that described by Zabetakis et al. in *Industrial and Engineering Chemistry*, Vol. 43, No. 9 p. 2120 (1951).

The flash point data (see Table IV) show that the CFC-11/HCFC-123/isopentane blends begin to exhibit a flash point when the isopentane composition is increased to about 20 weight percent. Mixtures with compositions within the azeotrope-like region defined in the previous example were shown not to exhibit a flash point, that is, they are nonflammable liquids.

TABLE IV

| Flash Point Data | | |
|---|---|---|
| CFC-11/HCFC-123/Isopentane | Flash Point (°F.) | |
| Composition | Open Cup | Closed Cup |
| 78/15/7 | None | None |
| 75/15/10 | None | None |
| 70/15/15 | None | None |
| 65/15/20 | −27 | None |

Vapor flammability data are summarized in Table V. The isopentane rich end of the azeotrope-like composition range does exhibit a narrow range of vapor flammability. This behavior would not, however, preclude use of these blends as a foam blowing agent.

TABLE V

| Vapor Flammability Data | | |
|---|---|---|
| CFC-11/HCFC-123/Isopentane | Lower Limit | Upper Limit |
| Composition | Volume % Mixture | |
| 79/15/6 | None | None |
| 75/15/10 | 14.6 | 15.6 |
| 70/15/15 | 8.0 | 15.8 |

EXAMPLE 4

This example describes an evaluation of the properties of rigid polyurethane and polyisocyanurate foams prepared using a 79/15/6 blend of CFC-11/HCFC-123/isopentane. Foams of similar density were prepared using 100 percent CFC-11 for comparison purposes.

Free-rise rigid polyurethane foams were prepared from the formulations specified in Table VI using a Martin Sweets Co. Modern Module III urethane foam machine at a delivery rate of 15 lbs./min. This polyurethane formulation is one example of a pour-in-place rigid polyurethane formulation which might be used as an appliance insulation.

The foams were characterized (Table VII) according to initial thermal conductivity (K-factor), density, dimensional stability, porosity (% closed-cells) and reactivity. Urethane foam produced using the azeotrope-like blend possesses almost identical properties to the CFC-11 expanded foams.

An advantage of the azeotrope-like blends over CFC-11 is their expansion efficiency. The above example shows that about 3% less blowing agent blend is required to achieve the same density.

Polyisocyanurate foams were produced in a similar manner to the polyurethane foams using the formulation described in Table VIII. Foam properties are summarized in Table IX. Again the foam expanded with the azeotrope-like blend possesses essentially identical properties to the CFC-11 expanded foam while the blend exhibits greater expansion efficiency over that of CFC-11.

TABLE VI

| Rigid Polyurethane Formulation | | |
|---|---|---|
| | Parts by Weight | |
| Component | (a) | (b) |
| Pluracol 1114[1] (420-OH#) | 100. | 100. |
| Silicone L-5340[2] | 1.5 | 1.5 |
| Thancat TD-33[3] | 0.5 | 0.5 |
| Thancat DME[4] | 0.2 | 0.2 |
| Catalyst T-12[5] | 0.1 | 0.1 |
| CFC-11 | 35. | — |
| CFC-11/HFC-123/Isopentane (79/15/6) | — | 34.1 |
| Lupranate M20S[6] (1.29 Index) | 129. | 129. |

[1]BASF Wyandotte Corp. - polyether polyol
[2]Union Carbide Corp. - silicone surfactant
[3]Texaco Inc. - 33% triethylene diamine in propylene glycol
[4]Texaco Inc. - N,N—dimethylethanolamine
[5]Metal & Thermit Co. - dibutyl dilaurate
[6]BASF Wyandotte Corp. - polymethylene polyphenylisocyanate

TABLE VII

| Rigid Urethane Foam Properties | | |
|---|---|---|
| Physical Properties | Formulation (a) | Formulation (b) |
| Density (lb/cu.ft.) | 2.0 | 2.0 |
| K-factor* (Btu in/hr ft$^2$ °F.) | 0.130 | 0.136 |
| Dimensional Stability* | | |
| % Vol. Change (−40° C. 24 hr) | −0.4 | 0.0 |
| % Vol. Change (70° C. 16 hr) | 0.4 | 0.0 |
| Porosity (% Closed-Cells) | 90.7 | 91.4 |
| Reactivity | | |
| Cream Time (sec) | 14. | 9. |
| Gel Time (sec) | 38. | 30. |
| Tack Free Time (sec) | 52. | 41. |

*5 day old foam

TABLE VIII

| Polyisocyanurate Formulation | | |
|---|---|---|
| | Parts by Weight | |
| Component | (c) | (d) |
| Foamol 250[1] (448-OH#) | 60. | 60. |
| Silicone L-5340[2] | 2.0 | 2.0 |
| DMP-30[3] | 1.3 | 1.3 |
| Foamcat 70[4] | 4.0 | 4.0 |
| PEG 200[5] | 6.7 | 6.7 |
| CFC-11 | 55.2 | — |
| CFC-11/HCFC-123/Isopentane (79/15/6) | — | 52.8 |

TABLE VIII-continued

Polyisocyanurate Formulation

| Component | Parts by Weight | |
|---|---|---|
| | (c) | (d) |
| Mondur MR200[6] (3.68 Index) | 240. | 240. |
| Percent Isocyanurate | 18. | 18. |

[1] Jim Walter Resources Inc.
[2] Union Carbide Corp.
[3] Rohm and Hass Co.
[4] Jim Walter Resources Inc.
[5] Union Carbide Corp.
[6] Mobay Chemical Corp.

TABLE IX

Polyisocyanurate Foam Properties

| Physical Properties | Formulation (c) | Formulation (d) |
|---|---|---|
| Density (lb/cu.ft.) | 1.83 | 1.83 |
| K-factor* | 0.141 | 0.141 |
| (Btu in/hr ft$^2$ °F.) | | |
| Dimensional Stability* | | |
| % Vol. Change (−40° C. 24 hr) | 0.0 | 0.0 |
| % Vol. Change (70° C. 16 hr) | −0.1 | 0.0 |
| Porosity (% Closed-Cells) | 92.8 | 92.6 |
| Reactivity | | |
| Cream Time (sec) | 10 | 13.7 |
| Gel Time (sec) | 34. | 23.2 |
| Tack Free Time (sec) | 46. | 30. |

*5 day old foam

What is claimed is:

1. Azeotrope-like compositions comprising from about 66 to about 80 weight percent trichlorofluoromethane, from about 17 to about 15 weight percent of a dichlorotrifluoroethane selected from the group consisting of 1,1-dichloro-2,2,2-trifluoroethane and 1,2-dichloro-1,1,2-trifluoroethane and from about 17 to about 5 weight percent isopentane.

2. Azeotrope-like compositions according to claim 1 in which the dichlorotrifluoroethane component is 1,1-dichloro-2,2,2-trifluoroethane.

3. Azeotrope-like compositions according to claim 2 comprising from about 79 weight percent trichlorofluoromethane, about 15 weight percent 1,1-dichloro-2,2,2-trifluoroethane and about 6 weight percent isopentane.

4. Azeotrope-like compositions according to claim 1 in which the dichlorotrifluoroethane component is 1,2-dichloro-1,2,2-trifluoroethane.

5. Azeotrope-like compositions according to claim 4 comprising about 78 weight percent trichlorofluoromethane, about 15 weight percent 1,2-dichloro-1,1,2-trifluoroethane and about 7 weight percent isopentane.

6. Azeotrope-like compositions according to claim 1 which consists essentially of the recited components.

7. Azeotrope-like compositions according to claim 3 which consist essentially of the recited components.

8. Azeotrope-like compositions according to claim 5 which consist essentially of the recited components.

9. The method of preparing polyurethane and polyisocyanurate foams which comprises reacting and foaming a mixture of ingredients which will react to form the polyurethane of polyisocyanurate foams in the presence of a blowing agent comprising a composition in accordance with claim 1.

10. The method of preparing polyurethane and polyisocyanurate foams which comprises reacting and foaming a mixture of ingredients which will react to form the polyurethane or polyisocyanurate foams in the presence of a blowing agent comprising a composition in accordance with claim 2.

11. The method of preparing polyurethane and polyisocyanurate foams which comprises reacting and foaming a mixture of ingredients which will react to form the polyurethane or polyisocyanurate foams in the presence of a blowing agent comprising a composition in accordance with claim 3.

12. The method of preparing polyurethane and polyisocyanurate foams which comprises reacting and foaming a mixture of ingredients which will react to form the polyurethane or polyisocyanurate foams in the presence of a blowing agent comprising a composition in accordance with claim 4.

13. The method of preparing polyurethane and polyisocyanurate foams which comprises reacting and foaming a mixture of ingredients which will react to form the polyurethane or polyisocyanurate foams in the presence of a blowing agent comprising a composition in accordance with claim 5.

* * * * *